United States Patent
Arnold

(10) Patent No.: US 12,447,694 B2
(45) Date of Patent: Oct. 21, 2025

(54) METHODS AND SYSTEMS FOR INSPECTING BONDED STRUCTURES

(71) Applicant: The Boeing Company, Chicago, IL (US)

(72) Inventor: David W. Arnold, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 456 days.

(21) Appl. No.: 17/568,784

(22) Filed: Jan. 5, 2022

(65) Prior Publication Data

US 2023/0211570 A1 Jul. 6, 2023

(51) Int. Cl.
| | |
|---|---|
| *B29C 65/82* | (2006.01) |
| *B29C 65/48* | (2006.01) |
| *G01N 19/04* | (2006.01) |
| *G01N 29/04* | (2006.01) |
| *B29L 31/30* | (2006.01) |

(52) U.S. Cl.
CPC .......... *B29C 65/8292* (2013.01); *B29C 65/48* (2013.01); *G01N 19/04* (2013.01); *G01N 29/043* (2013.01); *B29L 2031/3076* (2013.01)

(58) Field of Classification Search
CPC .... B29C 65/8292; B29C 65/48; G01N 19/04; G01N 29/043; G01N 2291/0422; G01N 2291/106; G01N 29/348; G01N 2291/0231; G01N 2291/048; G01N 2291/2675; G01N 29/262; B29L 2031/3076
See application file for complete search history.

(56) References Cited

U.S. PATENT DOCUMENTS

| | | | | |
|---|---|---|---|---|
| 4,366,713 A | * | 1/1983 | Gilmore | G01N 29/225 73/618 |
| 4,607,520 A | * | 8/1986 | Dam | G01N 29/449 73/61.79 |
| 6,474,165 B1 | * | 11/2002 | Harper | G01N 29/2487 73/628 |
| 9,567,104 B2 | | 2/2017 | Sweers et al. | |
| 2006/0201252 A1 | * | 9/2006 | Georgeson | G01N 29/2481 73/641 |
| 2009/0151457 A1 | * | 6/2009 | Iizuka | G01N 29/221 73/622 |
| 2012/0265449 A1 | * | 10/2012 | Ihn | C09J 5/00 702/33 |

* cited by examiner

*Primary Examiner* — Tarun Sinha

(74) *Attorney, Agent, or Firm* — Walters & Wasylyna LLC

(57) ABSTRACT

A method for inspecting a bonded structure, the bonded structure having a first structural member, a second structural member, and a bondline between the first structural member and the second structural member, includes projecting acoustic waves into the bonded structure at a non-zero angle relative to a normal axis defined by an external surface of the first structural member. The method further includes determining a magnitude of a total refraction of the acoustic waves after the acoustic waves pass through the bonded structure and comparing the magnitude of the total refraction to a predefined value.

20 Claims, 5 Drawing Sheets

METHODS AND SYSTEMS FOR INSPECTING BONDED STRUCTURES

FIELD

The present disclosure generally relates to bonded structures and, more particularly, to methods and systems for inspecting bonded structures.

BACKGROUND

Measuring the strength of bondlines between bonded structures, such as layers of aircraft components, can be an important step prior to the deployment of such components in an aircraft.

Current methods for inspecting bondlines between bonded structures include use of Laser Bond Inspection Detection. Drawbacks to Laser Bond Inspection Detection include potential of weakening and/or breaking the bondline of the bonded structure. This leads to potential for having to scrap the bonded structure after inspection.

Accordingly, those skilled in the art continue research and development in the field of inspecting bonded structures.

SUMMARY

The following is a non-exhaustive list of examples, which may or may not be claimed, of the subject matter according to the present disclosure Disclosed is a method for inspecting a bonded structure, the bonded structure having a first structural member, a second structural member, and a bondline between the first structural member and the second structural member.

In an example, the disclosed method includes projecting acoustic waves into the bonded structure at a non-zero angle relative to a normal axis defined by an external surface of the first structural member. The method further includes determining a magnitude of a total refraction of the acoustic waves after the acoustic waves pass through the bonded structure. The method further includes comparing the magnitude of the total refraction to a predefined value.

Also disclosed is a method for inspecting a bonded structure, the bonded structure having a first structural member, a second structural member, and a bondline between the first structural member and the second structural member.

In an example, the disclosed method includes acoustically coupling a first phased array ultrasonic transducer with an external surface of the first structural member. The method further includes acoustically coupling a second phased array ultrasonic transducer with an external surface of the second structural member. The method further includes projecting acoustic waves from the first phased array ultrasonic transducer into the bonded structure at a non-zero angle relative to a normal axis defined by the external surface of the first structural member, the acoustic waves having a frequency in a range from about 1 MHz to about 20 MHz. The method further includes determining a magnitude of a total refraction of the acoustic waves received by the second phased array ultrasonic transducer. The method further includes comparing the magnitude of the total refraction to a predefined value.

Also disclose is a system for inspecting a bonded structure, the bonded structure having a first structural member, a second structural member, and a bondline between the first structural member and the second structural member.

In an example, the disclosed system includes a first phased array ultrasonic transducer for acoustically coupling with an external surface of the first structural member, wherein the first phased array ultrasonic transducer is configured to project acoustic waves into the bonded structure at a non-zero angle relative to a normal axis defined by the external surface of the first structural member. The system further includes a second phased array ultrasonic transducer for acoustically coupling with an external surface of the second structural member, wherein the second phased array ultrasonic transducer is configured to receive the acoustic waves after the acoustic waves pass through the bonded structure. The system further includes a processor in communication with the first phased array ultrasonic transducer and the second phased array ultrasonic transducer. the processor is configured to determine a magnitude of a total refraction of the acoustic waves received by the second phased array ultrasonic transducer and compare the magnitude of the total refraction to a predefined value.

DETAILED DESCRIPTION

Figure 1:
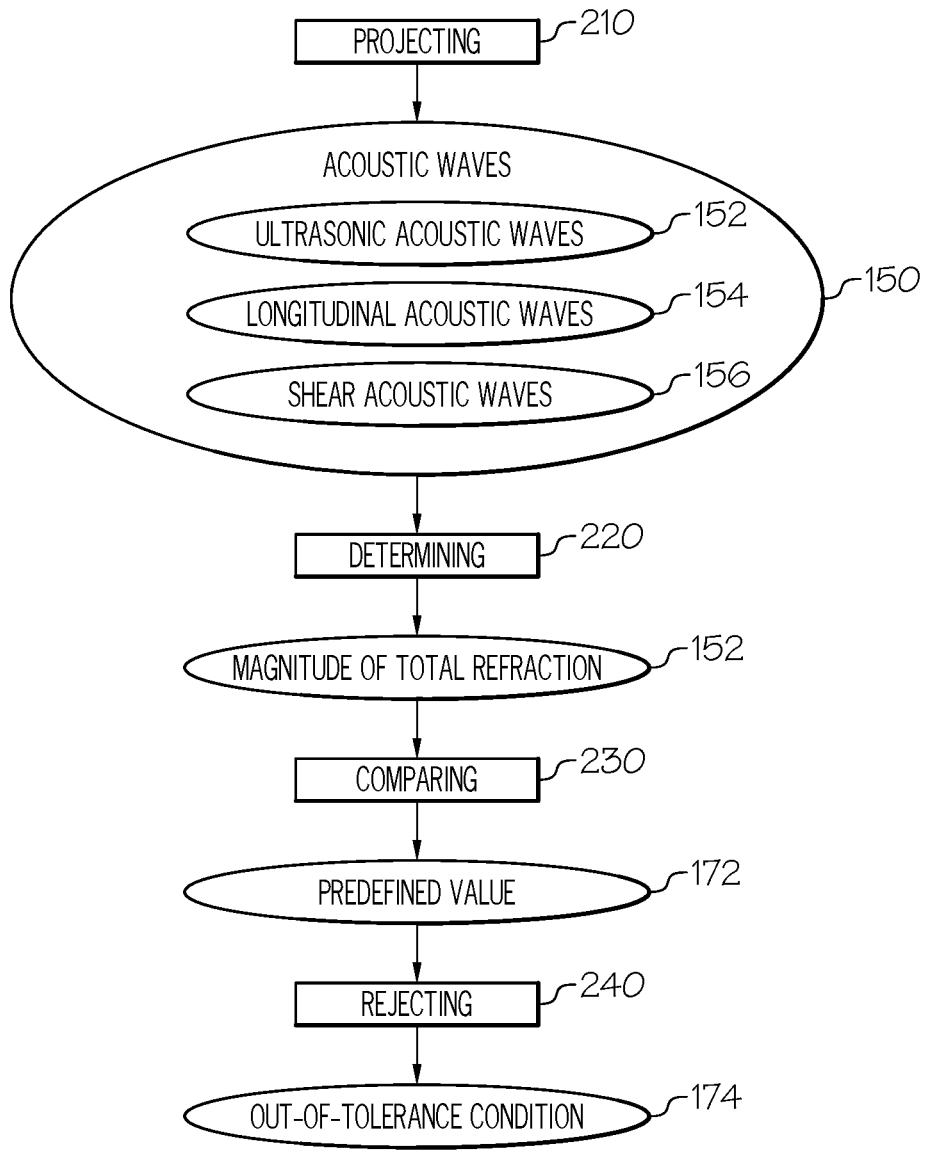
FIG. 1 is a flow chart of a method for inspecting a bonded structure.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according to the present disclosure are provided below. Reference herein to "example" means that one or more feature, structure, element, component, characteristic, and/or operational step described in connection with the example is included in at least one embodiment and/or implementation of the subject matter according to the present disclosure. Thus, the phrases "an example," "another example," "an example," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

The disclosed system 100 (FIGS. 3 and 4), method 200 (FIG. 1), and method 300 (FIG. 2) utilize known impedance values and accompanying sound refraction values of various materials, specifically across composite materials, metallic materials, and adhesives for bonding those materials. Using those values as predetermined thresholds, the system 100, method 200, and method 300 compare data collected of actual values across bonded structures to determine when an out-of-tolerance condition 174 is present. For example, if the bondline 160 at an area of interest along a bonded structure 110 changes, the resulting refracted angle changes, this indicating a potential out-of-tolerance condition 174.

Figure 6:
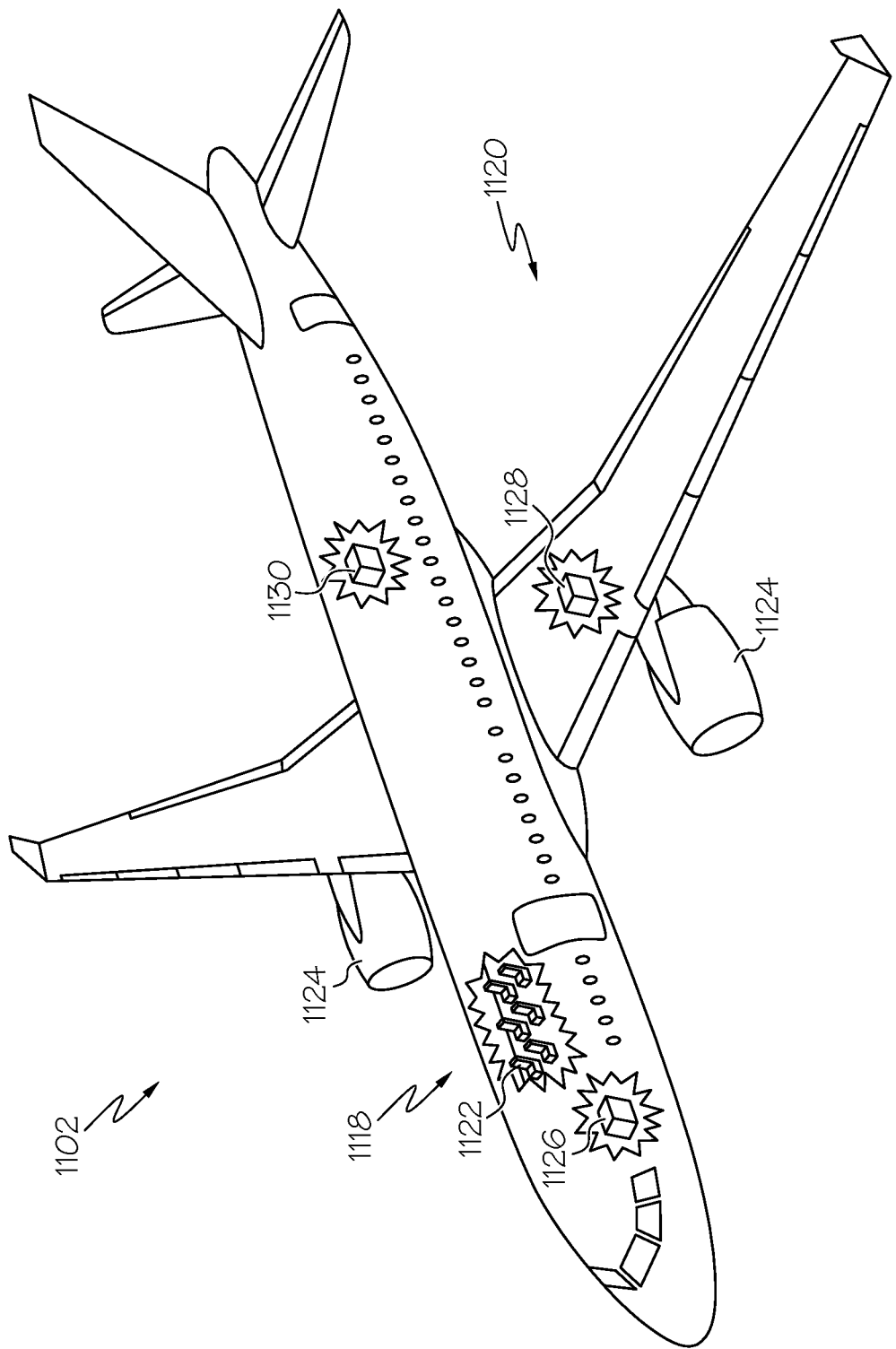
FIG. 6 is a schematic of the aircraft.

Referring to FIG. 1, disclosed is a method 200 for inspecting a bonded structure 110. The bonded structure 110 includes a first structural member 120, a second structural member 140, and a bondline 160 between the first structural member 120 and the second structural member 140. The first structural member 120 and the second structural member 140 may be components of an aircraft 1102, as shown in FIG. 6. In one example, the bondline 160 includes at least one layer of adhesive 162. In another example, the bondline 160 includes at least one of an epoxy adhesive, a polyurethane adhesive, and a toughened acrylic adhesive.

Each of the first structural member 120 and the second structural member 140 may include any material suitable for its intended application. In one or more examples, at least one of the first structural member 120 and the second structural member 140 includes a metallic material. In another example, at least one of the first structural member 120 and the second structural member 140 includes a composite material. In another example, at least one of the first structural member 120 and the second structural member 140 includes a composite material and the remaining structural member includes a metallic material. In yet another example, both the first structural member 120 and the second structural member 140 may include a metallic material. Further, both the first structural member 120 and the second structural member 140 may include a composite material.

As illustrated in FIG. 1, the disclosed method 200 includes the step of projecting 210 acoustic waves 150 into the bonded structure 110 at a non-zero angle T relative to a normal axis A defined by an external surface 108 of the first structural member 120. In one or more examples, the projecting 210 the acoustic waves 150 into the bonded structure 110 includes acoustically coupling a first phased array ultrasonic transducer 102 with the external surface 108 of the first structural member 120. In one or more examples, the first phased array ultrasonic transducer 102 includes a single element ultrasound.

The non-zero angle T may depend on several factors, including material composition of the first structural member 120 and the second structural member 140, material composition of the bondline 160, and type of acoustic waves 150 projected onto the bonded structure 110. In one or more examples, the non-zero angle T is in a range from about 20 degree to about 80 degrees. In another example, the non-zero angle T is in a range from about 3 degrees to about 30 degrees. In yet another example, the non-zero angle T is in a range from about 30 degree to about 70 degrees.

Any type of acoustic waves 150 may be implemented for inspection and detection for out-of-tolerance condition 174s. In one example, the acoustic waves 150 are ultrasonic acoustic waves 152. In another example, the acoustic waves 150 are substantially longitudinal acoustic waves 154, for example with composite substrates. In yet another example, the acoustic waves 150 are substantially shear acoustic waves 156, for example with metallic substrates. The non-zero angle T may be a function of the type of acoustic waves 150. For example, substantially shear acoustic waves 156 may have a non-zero angle T in a range from about 30 degree to about 70 degrees, while substantially longitudinal acoustic waves 154 may have a non-zero angle T in a range from about 3 degrees to about 30 degrees.

The acoustic waves 150 may have a frequency in a range from about 1 MHz to about 20 MHz. In one example, the acoustic waves 150 have a frequency in a range from about 3 MHz to about 7 MHz. In another example, the acoustic waves 150 have a frequency in a range from about 1 MHz to about 5 MHz. In one or more examples, at least one of the first structural member 120 and the second structural member 140 includes a composite material and the acoustic waves 150 have a frequency in a range from about 2 MHz to about 4 MHz.

Still referring to FIG. 1, the method 200 further includes the step of determining 220 a magnitude of a total refraction 170 of the acoustic waves 150 after the acoustic waves 150 pass through the bonded structure 110. In one example, the determining 220 the magnitude of the total refraction 170 of the acoustic waves 150 may include determining 220 a location of a maximum amplitude signal within the second phased array ultrasonic transducer 104. In another example, the determining 220 the magnitude of the total refraction 170 of the acoustic waves 150 may include acoustically coupling a second phased array ultrasonic transducer 104 with an external surface 118 of the second structural member 140.

Still referring to FIG. 1, the method 200 further includes the step of comparing 230 the magnitude of the total refraction 170 to a predefined value 172. The comparing 230 assists in detection of the presence of an out-of-tolerance condition 174. In one example, an out-of-tolerance condition 174 is present when a difference between the magnitude of the total refraction 170 and the predefined value 172 exceeds a threshold. The threshold may be based upon a value that lies outside of a predetermined tolerance.

Still referring to FIG. 1, the method 200 may further include the step of rejecting 240 the bonded structure 110 when the out-of-tolerance condition 174 is present. Upon rejecting 240, the bonded structure 110 may be subject to further processing or scrapping dependent upon the reason for rejecting 240.

Figure 2:
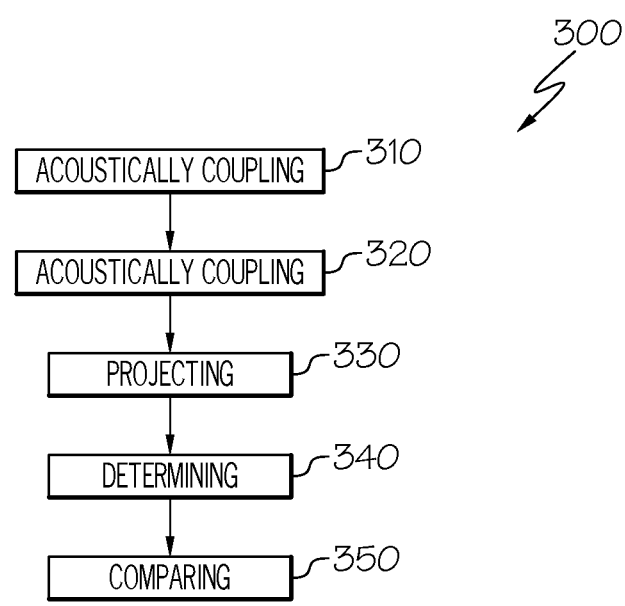
FIG. 2 is a flow chart of a method for inspecting a bonded structure.

Referring to FIG. 2, disclosed is a method 300 for inspecting a bonded structure 110. The bonded structure 110 includes a first structural member 120, a second structural member 140, and a bondline 160 between the first structural member 120 and the second structural member 140. The first structural member 120 and the second structural member 140 may be components of an aircraft 1102, see FIG. 6. In one example, the bondline 160 includes at least one layer of adhesive 162. In another example, the bondline 160 includes at least one of an epoxy adhesive, a polyurethane adhesive, and a toughened acrylic adhesive.

Each of the first structural member 120 and the second structural member 140 may include any material suitable for its intended application. In one or more examples, at least one of the first structural member 120 and the second structural member 140 includes a metallic material. In another example, at least one of the first structural member 120 and the second structural member 140 includes a composite material. In another example, at least one of the first structural member 120 and the second structural member 140 includes a composite material and the remaining structural member includes a metallic material. In yet another example, both the first structural member 120 and the second structural member 140 may include a metallic material. Further, both the first structural member 120 and the second structural member 140 may include a composite material.

Still referring to FIG. 2, in one or more examples, the method 300 includes the step of acoustically coupling 310 a first phased array ultrasonic transducer 102 with an external surface 108 of the first structural member 120. The method 300 further includes acoustically coupling 320 a second phased array ultrasonic transducer 104 with an external surface 118 of the second structural member 140.

Still referring to FIG. 2, the method 300 includes the step of projecting 330 acoustic waves 150 from the first phased array ultrasonic transducer 102 into the bonded structure 110 at a non-zero angle T relative to a normal axis A defined by the external surface 108 of the first structural member 120. In one or more examples, the first phased array ultrasonic transducer 102 includes a single element ultrasound.

The non-zero angle T may be dependent upon several factors including material composition of the first structural member 120 and the second structural member 140, material composition of the bondline 160, and type of acoustic waves 150 projected onto the bonded structure 110. In one or more examples, the non-zero angle T is in a range from about 20 degree to about 80 degrees. In another example, the non-zero angle T is in a range from about 3 degrees to about 30 degrees. In yet another example, the non-zero angle T is in a range from about 30 degree to about 70 degrees.

Any type of acoustic waves 150 may be implemented for inspection and detection for out-of-tolerance condition 174s. In one example, the acoustic waves 150 are ultrasonic acoustic waves 152. In another example, the acoustic waves 150 are substantially longitudinal acoustic waves 154. In yet another example, the acoustic waves 150 are substantially shear acoustic waves 156. The non-zero angle T may be a function of the type of acoustic waves 150. For example, substantially shear acoustic waves 156 may have a non-zero angle T in a range from about 30 degree to about 70 degrees, while substantially longitudinal acoustic waves 154 may have a non-zero angle T in a range from about 3 degrees to about 30 degrees.

The acoustic waves 150 may have a frequency in a range from about 1 MHz to about 20 MHz. In one example, the acoustic waves 150 have a frequency in a range from about 3 MHz to about 7 MHz. In another example, the acoustic waves 150 have a frequency in a range from about 1 MHz to about 5 MHz. In one or more examples, at least one of the first structural member 120 and the second structural member 140 includes a composite material and the acoustic waves 150 have a frequency in a range from about 2 MHz to about 4 MHz.

Still referring to FIG. 2, the method 300 includes the step of determining 340 a magnitude of a total refraction 170 of the acoustic waves 150 received by the second phased array ultrasonic transducer 104. In one example, the determining 340 the magnitude of the total refraction 170 of the acoustic waves 150 may include determining 340 a location of a maximum amplitude signal within the second phased array ultrasonic transducer 104. In another example, the determining 340 the magnitude of the total refraction 170 of the acoustic waves 150 may include acoustically coupling a second phased array ultrasonic transducer 104 with an external surface 118 of the second structural member 140.

Still referring to FIG. 2, the method 300 includes the step of comparing 350 the magnitude of the total refraction 170 to a predefined value 172. The comparing 350 assists in detection of the presence of an out-of-tolerance condition 174. In one example, an out-of-tolerance condition 174 is present when a difference between the magnitude of the total refraction 170 and the predefined value 172 exceeds a threshold. The threshold may be based upon a value that lies outside of a predetermined tolerance.

Figure 3:
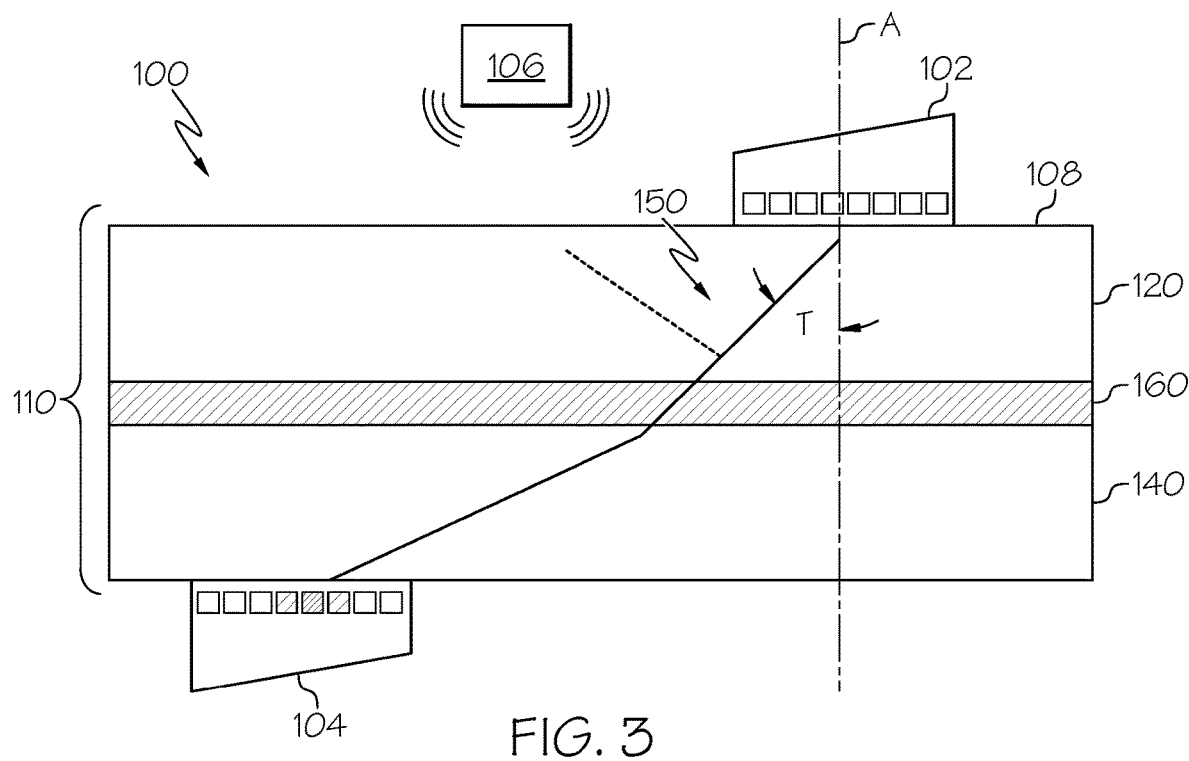
FIG. 3 is a cross-sectional schematic of a system for inspecting a bonded structure.
Figure 4:
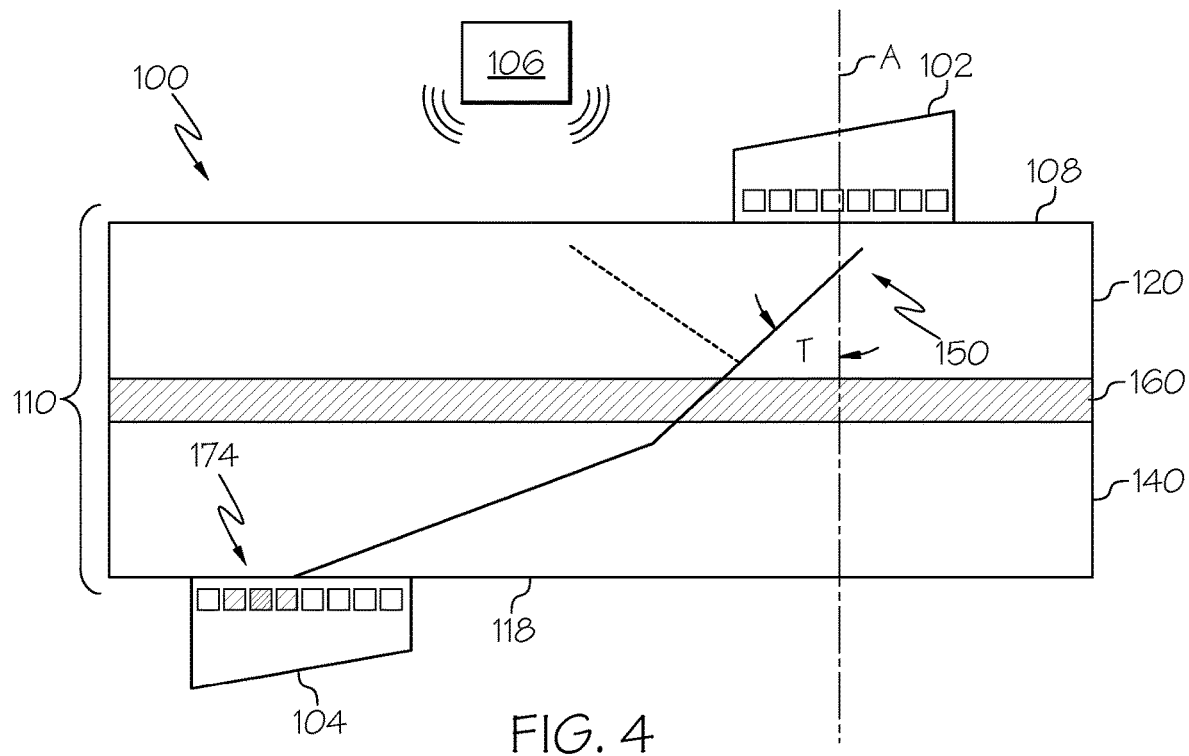
FIG. 4 is a cross-sectional schematic of a system for inspecting a bonded structure.

Referring to FIGS. 3 and 4, disclosed is a system 100 for inspecting a bonded structure 110. The bonded structure 110 includes a first structural member 120, a second structural member 140, and a bondline 160 between the first structural member 120 and the second structural member 140. The first structural member 120 and the second structural member 140 may be components of an aircraft 1102, see FIG. 6. In one example, the bondline 160 includes at least one layer of adhesive 162. In another example, the bondline 160 includes at least one of an epoxy adhesive, a polyurethane adhesive, and a toughened acrylic adhesive.

Each of the first structural member 120 and the second structural member 140 may include any material suitable for its intended application. In one or more examples, at least one of the first structural member 120 and the second structural member 140 includes a metallic material. In another example, at least one of the first structural member 120 and the second structural member 140 includes a composite material. In another example, at least one of the first structural member 120 and the second structural member 140 includes a composite material and the remaining structural member includes a metallic material. In yet another example, both the first structural member 120 and the second structural member 140 may include a metallic material. Further, both the first structural member 120 and the second structural member 140 may include a composite material.

In one or more examples, the system 100 includes a first phased array ultrasonic transducer 102 for acoustically coupling with an external surface 108 of the first structural member 120. In an example, the first phased array ultrasonic transducer 102 is configured to project acoustic waves 150 into the bonded structure 110 at a non-zero angle T relative to a normal axis A defined by the external surface 108 of the first structural member 120.

The non-zero angle T may be dependent upon several factors including material composition of the first structural member 120 and the second structural member 140, material composition of the bondline 160, and type of acoustic waves 150 projected onto the bonded structure 110. In one or more examples, the non-zero angle T is in a range from about 20 degree to about 80 degrees. In another example, the non-zero angle T is in a range from about 3 degrees to about 30 degrees. In yet another example, the non-zero angle T is in a range from about 30 degree to about 70 degrees.

Any type of acoustic waves 150 may be implemented for inspection and detection for out-of-tolerance condition 174s. In one example, the acoustic waves 150 are ultrasonic acoustic waves 152. In another example, the acoustic waves 150 are substantially longitudinal acoustic waves 154. In yet another example, the acoustic waves 150 are substantially shear acoustic waves 156. The non-zero angle T may be a function of the type of acoustic waves 150.

The acoustic waves 150 may have a frequency in a range from about 1 MHz to about 20 MHz. In one example, the acoustic waves 150 have a frequency in a range from about 3 MHz to about 7 MHz. In another example, the acoustic waves 150 have a frequency in a range from about 1 MHz to about 5 MHz. In one or more examples, at least one of the first structural member 120 and the second structural member 140 includes a composite material and the acoustic waves 150 have a frequency in a range from about 2 MHz to about 4 MHz.

Still referring to FIGS. 3 and 4, the system 100 further includes a second phased array ultrasonic transducer 104 for acoustically coupling with an external surface 118 of the second structural member 140. In one or more examples, the second phased array ultrasonic transducer 104 is configured to receive the acoustic waves 150 after the acoustic waves 150 pass through the bonded structure 110. FIG. 3 illustrates projection of acoustic waves 150 at one angle and FIG. 4 illustrates projection of acoustic waves 150 at a different angle.

As illustrated in FIGS. 3 and 4, the system 100 further includes a processor 106 in communication (e.g., wired or wireless communication) with the first phased array ultrasonic transducer 102 and the second phased array ultrasonic transducer 104. The processor 106 is configured to determine a magnitude of a total refraction 170 of the acoustic waves 150 received by the second phased array ultrasonic transducer 104. The processor 106 is further configured to compare the magnitude of the total refraction 170 to a predefined value 172. The processor 106 may be automated such that it automatically determines the magnitude of total refraction 170 upon receiving the acoustic waves 150.

Figure 5:
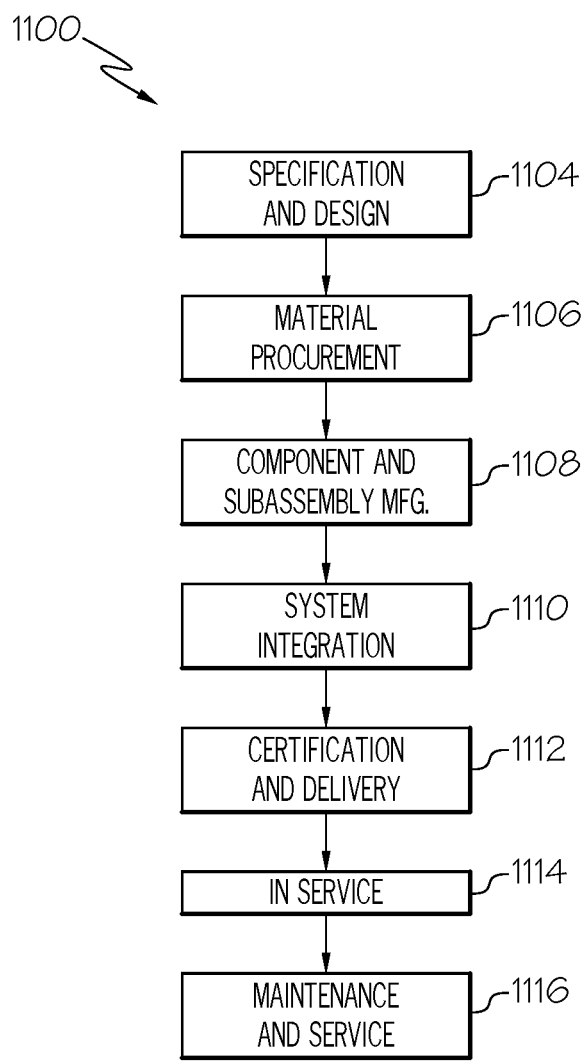
FIG. 5 is a flow chart is a block diagram of aircraft production and service methodology.

Examples of the present disclosure may be described in the context of aircraft manufacturing and service method 1100 as shown in FIG. 5 and aircraft 1102 as shown in FIG. 6. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc., of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Structure(s) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the structure(s), method(s), or combination thereof may be utilized during production stages production, component and subassembly manufacturing (Block 1108) and system integration (Block 1110), for example, by substantially expediting assembly of or reducing the cost of aircraft 1102. Similarly, one or more examples of the structure or method realizations, or a combination thereof, may be utilized, for example and without limitation, while aircraft 1102 is in service (Block 1114) and/or during maintenance and service (Block 1116).

Different examples of the structure(s) and method(s) disclosed herein include a variety of components, features, and functionalities. It should be understood that the various examples of the structure(s) and method(s) disclosed herein may include any of the components, features, and functionalities of any of the other examples of the structure(s) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for inspecting a bonded structure, the bonded structure comprising a first structural member, a second structural member, and a bondline between the first structural member and the second structural member, the bondline comprising at least one of an epoxy adhesive, a polyurethane adhesive, and a toughened acrylic adhesive, the method comprising:

acoustically coupling a first phased array ultrasonic transducer with an external surface of the first structural member, the first structural member comprising at least one of a composite material and a metallic material;

acoustically coupling a second phased array ultrasonic transducer with an external surface of the second structural member, the second structural member comprising at least one of a composite material and a metallic material;

projecting acoustic waves from the first phased array ultrasonic transducer into the bonded structure at a non-zero angle relative to a normal axis defined by the external surface of the first structural member;

receiving the acoustic waves at the second phased array ultrasonic transducer, the acoustic waves being refracted as they pass from the first phased array ultrasonic transducer, through the bonded structure, and to the second phased array ultrasonic transducer;

determining an actual refraction value of the acoustic waves received at the second phased array ultrasonic transducer; and comparing the actual refraction value to a predetermined refraction value.

2. The method of claim 1 wherein the acoustic waves are ultrasonic acoustic waves.

3. The method of claim 1 wherein the acoustic waves have a frequency in a range from about 1 MHz to about 20 MHz.

4. The method of claim 1 wherein at least one of the first structural member and the second structural member comprises a metallic material, and wherein the acoustic waves have a frequency in a range from about 3 MHz to about 7 MHz.

5. The method of claim 1 wherein at least one of the first structural member and the second structural member comprises a composite material, and wherein the acoustic waves have a frequency in a range from about 1 MHz to about 5 MHz.

6. The method of claim 1 wherein at least one of the first structural member and the second structural member comprises a composite material, and wherein the acoustic waves have a frequency in a range from about 2 MHz to about 4 MHz.

7. The method of claim 1 wherein the acoustic waves are substantially longitudinal acoustic waves.

8. The method of claim 7 wherein the non-zero angle is in a range from about 3 degree to about 30 degrees.

9. The method of claim 8 wherein at least one of the first structural member and the second structural member comprises a composite material.

10. The method of claim 1 wherein the acoustic waves are substantially shear acoustic waves.

11. The method of claim 10 wherein the non-zero angle is in a range from about 20 degrees to about 80 degrees.

12. The method of claim 11 wherein the non-zero angle is in a range from about 30 degrees to about 70 degrees.

13. The method of claim 1 wherein the determining the actual refraction value of the acoustic waves comprises determining a location of a maximum amplitude signal within the second phased array ultrasonic transducer.

14. The method of claim 1 wherein an out-of-tolerance condition is present when a difference between the actual refraction value and the predetermined refraction value exceeds a threshold.

15. The method of claim 14 further comprising rejecting the bonded structure when the out-of-tolerance condition is present.

16. A method for inspecting a bonded structure, the bonded structure comprising a first structural member, a second structural member, and a bondline between the first structural member and the second structural member, the first structural member and the second structural member comprising composite material, the bondline comprising at least one of an epoxy adhesive, a polyurethane adhesive, and a toughened acrylic adhesive, the method comprising:
 acoustically coupling a first phased array ultrasonic transducer with an external surface of the first structural member;
 acoustically coupling a second phased array ultrasonic transducer with an external surface of the second structural member;
 projecting acoustic waves from the first phased array ultrasonic transducer into the bonded structure at a non-zero angle relative to a normal axis defined by the external surface of the first structural member, the acoustic waves having a frequency in a range from about 1 MHz to about 20 MHz;
 receiving the acoustic waves at the second phased array ultrasonic transducer, the acoustic waves being refracted as they pass from the first phased array ultrasonic transducer, through the bonded structure, and to the second phased array ultrasonic transducer;
 determining an actual refraction value of the acoustic waves received by the second phased array ultrasonic transducer at the external surface of the second structural member after the acoustic waves pass through the first structural member, the bondline and the second structural member of the bonded structure; and
 comparing the actual refraction value to a predetermined refraction value.

17. A system for inspecting a bonded structure, the bonded structure comprising a first structural member, a second structural member, and a bondline between the first structural member and the second structural member, the first structural member and the second structural member comprising composite material, the bondline comprising at least one of an epoxy adhesive, a polyurethane adhesive, and a toughened acrylic adhesive, the system comprising:
 a first phased array ultrasonic transducer for acoustically coupling with an external surface of the first structural member, wherein the first phased array ultrasonic transducer is configured to project acoustic waves into the bonded structure at a non-zero angle relative to a normal axis defined by the external surface of the first structural member;
 a second phased array ultrasonic transducer for acoustically coupling with an external surface of the second structural member, wherein the second phased array ultrasonic transducer is configured to receive the acoustic waves after the acoustic waves pass through the first structural member, the bondline and the second structural member of the bonded structure; and
 a processor in communication with the first phased array ultrasonic transducer and the second phased array ultrasonic transducer, the processor being configured to:
  determine an actual refraction value of the acoustic waves received by the second phased array ultrasonic transducer; and
  compare the actual refraction value to a predetermined refraction value.

18. The method of claim 1 wherein the first structural member comprises the composite material and the second structural member comprises the metallic material.

19. The method of claim 1 wherein the first structural member and the second structural member comprise the composite material.

20. The method of claim 1 wherein the bondline comprises the epoxy adhesive.

* * * * *